(12) United States Patent
Carrell et al.

(10) Patent No.: US 7,620,958 B2
(45) Date of Patent: Nov. 17, 2009

(54) TRANSACTION INTEROPERABILITY USING HOST-INITIATED PROCESSING

(75) Inventors: Douglas R. Carrell, Sammamish, WA (US); Terry Wayne Bullington, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 671 days.

(21) Appl. No.: 10/610,689

(22) Filed: Jun. 30, 2003

(65) Prior Publication Data

US 2004/0268371 A1 Dec. 30, 2004

(51) Int. Cl.
G06F 3/00 (2006.01)
G06F 9/44 (2006.01)
G06F 9/46 (2006.01)
G06F 13/00 (2006.01)

(52) U.S. Cl. ........................ 719/319; 719/313; 719/320; 709/217; 709/246; 707/106; 707/108

(58) Field of Classification Search ................. 719/330, 719/313, 319, 320; 709/246, 217; 717/106–108, 717/114
See application file for complete search history.

(56) References Cited

U.S. PATENT DOCUMENTS

| | | | | |
|---|---|---|---|---|
| 5,504,885 A | * | 4/1996 | Alashqur | 717/141 |
| 5,604,896 A | * | 2/1997 | Duxbury et al. | 703/26 |
| 5,764,979 A | * | 6/1998 | Blackman et al. | 707/102 |
| 5,765,162 A | * | 6/1998 | Blackman et al. | 707/103 R |
| 5,819,030 A | * | 10/1998 | Chen et al. | 709/220 |
| 5,826,065 A | | 10/1998 | Hinsberg, III et al. | 395/500 |
| 6,202,089 B1 | | 3/2001 | Juster | 709/219 |
| 6,209,124 B1 | * | 3/2001 | Vermeire et al. | 717/114 |
| 6,230,117 B1 | | 5/2001 | Lymer et al. | 703/22 |
| 6,240,417 B1 | * | 5/2001 | Eastwick et al. | 707/10 |
| 6,298,391 B1 | | 10/2001 | Kennedy et al. | 709/328 |
| 6,347,342 B1 | * | 2/2002 | Marcos et al. | 719/315 |
| 6,374,207 B1 | | 4/2002 | Li et al. | 703/27 |
| 6,442,663 B1 | * | 8/2002 | Sun et al. | 711/202 |
| 6,535,878 B1 | * | 3/2003 | Guedalia et al. | 707/8 |
| 6,963,905 B1 | * | 11/2005 | Melman | 709/213 |
| 2003/0120593 A1 | * | 6/2003 | Bansal et al. | 705/39 |

OTHER PUBLICATIONS

Tanenbaum, Andrew S., "Computer networks," Third Edition, Prentice Hall PTR, 1996; pp. 16-28, 202-206.*

(Continued)

*Primary Examiner*—Diem Ky Cao
(74) *Attorney, Agent, or Firm*—Woodcock Washburn LLP (57) ABSTRACT

Systems and methods are disclosed to support Host Initiated Processing (HIP), in which an application in a first system calls a software object in a second system that is in some respect incompatible with the first system. The calling application resides in a legacy system (e.g., an IBM mainframe), and is written based on a programming model (e.g., CICS). The called software object is based on a WINDOWS-based programming model (e.g., COM or .NET), which is incompatible with the legacy system's programming model. The HIP system converts a call from the legacy system so that the call is usable with the WINDOWS-based system, and also converts the result provided by the WINDOWS-based system into a form usable by the legacy system. Example aspects of incompatibilities between a legacy system and a WINDOWS-based system include: data representation, data types, communications protocol, passing of call parameters and return values, and error handling.

28 Claims, 8 Drawing Sheets

OTHER PUBLICATIONS

Taylor, Ed, "SNA & TCP/IP Integration Handbook." Taylor Networking Series, McGraw-Hill, 1999; retrieved from <http://www.netlibrary.com/Reader/> on Aug. 16, 2006; pp. iii, iv, 66-70 and 386-395.*

Tanenbaum, Andrew S., "Computer Networks," Third Edition, Prentice Hall PTR, 1996; pp. 40-43, 521-529.*

Taylor, Ed, "SNA & TCP/IP Integration Handbook." Taylor Networking Series, McGraw-Hill, 1999; retrieved from <http://www.netlibrary.com/Reader/> on Aug. 16, 2006; pp. iii, iv, 132-141, 313-318, 420-425, 909.*

"Connecting Desktops to Data: IP Access to Host Resources," Cisco Systems, Inc. and StarQuest Software, Inc., Aug. 1999; retrieved from <http://www.starquest.com/whitepapers/ctrcv2.html> on Aug. 23, 2007.*

Taylor, Ed, "SNA & TCP/IP Integration Handbook." Taylor Networking Series, McGraw-Hill, 1999; retrieved from <http://www.netlibrary.com/Reader/> on Aug. 16, 2006; pp. 37-54, 922, 925.*

Coulouris et al., "Distributed Systems, Concepts and Design," Second Edition, Addison-Wesley, 1994; pp. 165-178, 354-356.*

* cited by examiner

FIG. 1 (previous developments)

TRANSACTION INTEROPERABILITY USING HOST-INITIATED PROCESSING

FIELD OF THE INVENTION

The present invention relates generally to the field of distributed computing. More particularly, the invention provides a system and method that supports interoperability between incompatible computing environments.

BACKGROUND OF THE INVENTION

Interoperability of computer systems has become increasingly important for enterprises. It is often the case that enterprises have extremely large legacy data stores that are maintained in propriety storage format. Additionally, enterprise customers often have a substantial investment in application systems that may span a decade or more of development effort. These business applications typically reside in IBM CICS (Customer Information Control System) and IMS (Information Management System) Transaction Manager environments. Even as technology has moved forward, enterprise customers have been reluctant to move their line of critical business application and data to distributed environments, such as those based on the WINDOWS operating systems.

However, in recent years customers have been building more new applications within distributed computing environments such as WINDOWS, COM+, .Net, SQL Server and BizTalk. The problem the enterprise data center manager faces is the ability to bridge the legacy application and data stores maintained in the centralized data center with new applications built on emerging technologies in distributed environments.

In essence, the problem in using legacy systems with new environments is one of interoperability. Legacy systems may employ data types, communication protocols, function-calling mechanisms, programming models, etc., that are not compatible with newer systems. Thus, if an application in a legacy system (e.g., an IBM CICS system) attempts to call a software object in a newer system (e.g., a WINDOWS system), the call may not be understood for a variety of reasons. For example, the legacy system and the newer system may represent data in a different manner (e.g., length specified character strings versus null-terminated character strings), may use different communications protocols to support calls to remote objects (e.g., System Network Architecture (SNA) versus Transport Control Protocol (TCP)), and one system may use a data type (e.g., dependent-sized arrays) that are not supported in the other system. In theory, object-oriented programming allows two objects that know little about each other to interoperate with each other through a known interface. However, incompatibilities such as those described above often thwart this type of interoperability between heterogeneous systems (i.e., systems of different types), such as between an IBM mainframe and a WINDOWS-based system.

In view of the foregoing, there is a need for a system and method that overcomes the drawbacks of the prior art.

SUMMARY OF THE INVENTION

The present invention provides a system and method that enables two incompatible systems to interoperate with each other. Typically, this interoperation takes the form of a software object in a first system calling a software object in a second system. Typically, the first system is a non-WINDOWS system, such as a IBM mainframe, and the second system is a system based on the WINDOWS environment. The situation in which a non-WINDOWS system calls upon the functionality of a WINDOWS-based system may be referred to as "Host Initiated Processing" (HIP), where the non-WINDOWS system is referred to as the "host."

A system to support HIP (also referred to herein as an "HIP system," or, simply, "HIP"), may take the form of a service that executes on a WINDOWS-based system. The HIP system includes logic to receive requests or calls from the legacy system and to convert those requests or calls into a form that can be used with software in the WINDOWS-based system that has been written according to WINDOWS-based programming models, such as Component Object Model (COM) or .NET. The conversion may include:

Conversion of elemental data types from the format used by the legacy system to that used by the WINDOWS-based system (e.g., changing the format in which integers, floats, strings, etc., are represented);

Reformatting of legacy aggregate data types to aggregate data types used in the WINDOWS-based system (e.g., the COBOL language ("COmmon Business Oriented Language") supports dependent-sized arrays, while Visual Basic and other WINDOWS-oriented programming languages do not);

Receiving the request or call from the legacy system according to one protocol, and then recasting that request or call according to a different protocol that is used by the WINDOWS-based system (e.g., IBM systems often communicate using SNA and TCP/IP, while WINDOWS-based systems may use Messaging, RPC, DCOM or .NET Remoting services);

Changing the mechanism by which function parameters and return values are handled (e.g., COBOL uses one "comm area" both to pass the parameters and receive the return value, while WINDOWS uses one data space for parameters and another for a return value);

Other types of conversions needed to handle other incompatibilities, which are more particularly descried below.

HIP allows an enterprise to benefit from both the legacy system and a newer system in a cost effective manner. The enterprise can continue to use its legacy client line of business applications (e.g., in CICS and IMS), and can interoperate with application servers and data that execute in WINDOWS-based environments by redirecting connections from legacy server environments to HIP-enabled server applications. Thus, HIP allows reuse of existing legacy client application, while enabling the customer to develop new applications systems based on emerging industry technologies.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

The present invention provides an HIP system, which supports interoperability between two incompatible systems. The systems may be incompatible for reasons relating to data representation, data types, communication protocols, programming models, or other reasons (or any combination of the foregoing reasons). In a typical scenario, the HIP system supports a call to a software object in a WINDOWS-based environment (e.g., a COM or .NET object), where the call is made by an application in a legacy system (e.g., an IBM mainframe) based on a non-WINDOWS programming model (e.g., CICS). However, it will be understood that the techniques described herein are not limited to this scenario.

An HIP system preferably includes COBOL and RPG (Report Program Generator) data declaration importers, which create metadata encoding schemes that enable the HIP runtime environment (see below) to transform legacy data (e.g., IBM OS/390 and OS/400 data types from COBOL and RPG data constructs) into WINDOWS/INTEL x86 data types that can be consumed by COM and .NET programming models. Preferably, the metadata is stored in a file with a .TIM extension. ("TIM" stands for "transaction integrator metadata".) The .TIM file is independent of the COM Server Object and the .Net Assembly. The .TIM file contains annotation that marry the legacy data (e.g., the COBOL and RPG data types and aggregate constructs) to the full range of automation data types (variant data types) and to the full range of .NET CLS data type and constructs.

The HIP system allows developers to develop client and server application programs in their normal manner without the requirement for knowledge of the "foreign" system. A development tool is provided that aids and integration analyst in merging the two environments. An HIP system further includes a development tool, which allows a user to interactively build the .TIM file by matching and configuring COM or .Net data type to COBOL or RPG data types. An HIP administrative environment uses portions of the .TIM file content to define relationships between a CICS and/or IMS application program, a listener in the HIP runtime environment (see below, in connection with FIG. 6), and a method on the server object.

The HIP runtime environment, which is described below in connection with FIG. 6 and is also referred to as an "HIP service," implements algorithms and uses techniques for translating from legacy data streams (e.g., OS/390 and OS/400 data streams) to COM automation and .NET remote server programming models based on the contents of the .TIM file. The HIP runtime environment listens for incoming requests generated from CICS and IMS transaction programs, and receives the data streams based on programming models identified in the .TIM file. When the COM or .NET object completes its processing, the HIP Runtime environment implements algorithms and uses techniques to return the data stream to the CICS or IMS transaction programs in a programming model specific format.

The HIP runtime and administrative environments also implement algorithms and use techniques for mapping port numbers and transaction names to methods on COM and .Net objects in complex and flexible manners to provide a secure, scalable and performant interoperability environment between legacy systems (e.g., OS/390, OS/400 systems) and WINDOWS-based platforms.

Exemplary Computing Environment

Figure 1:
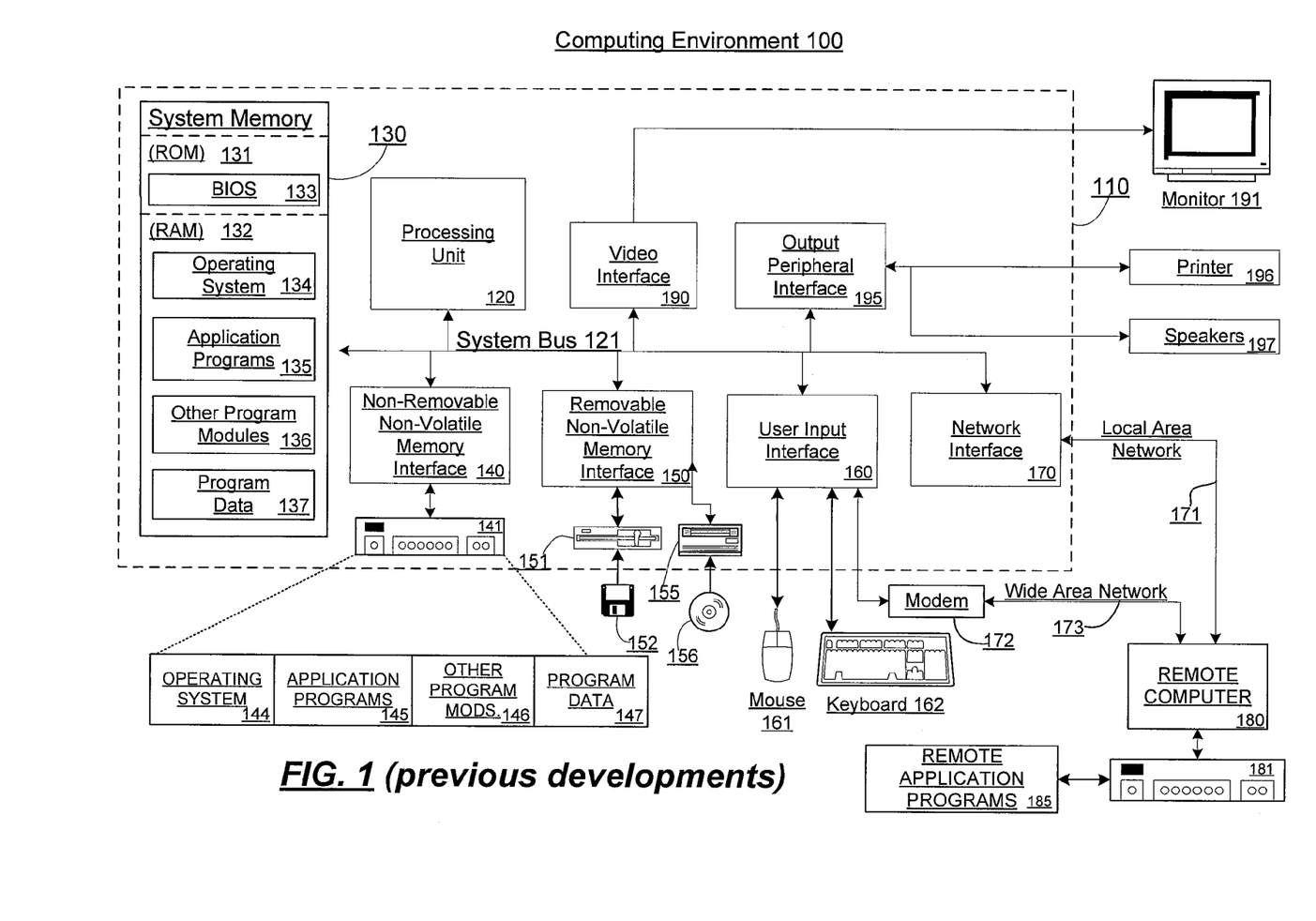
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
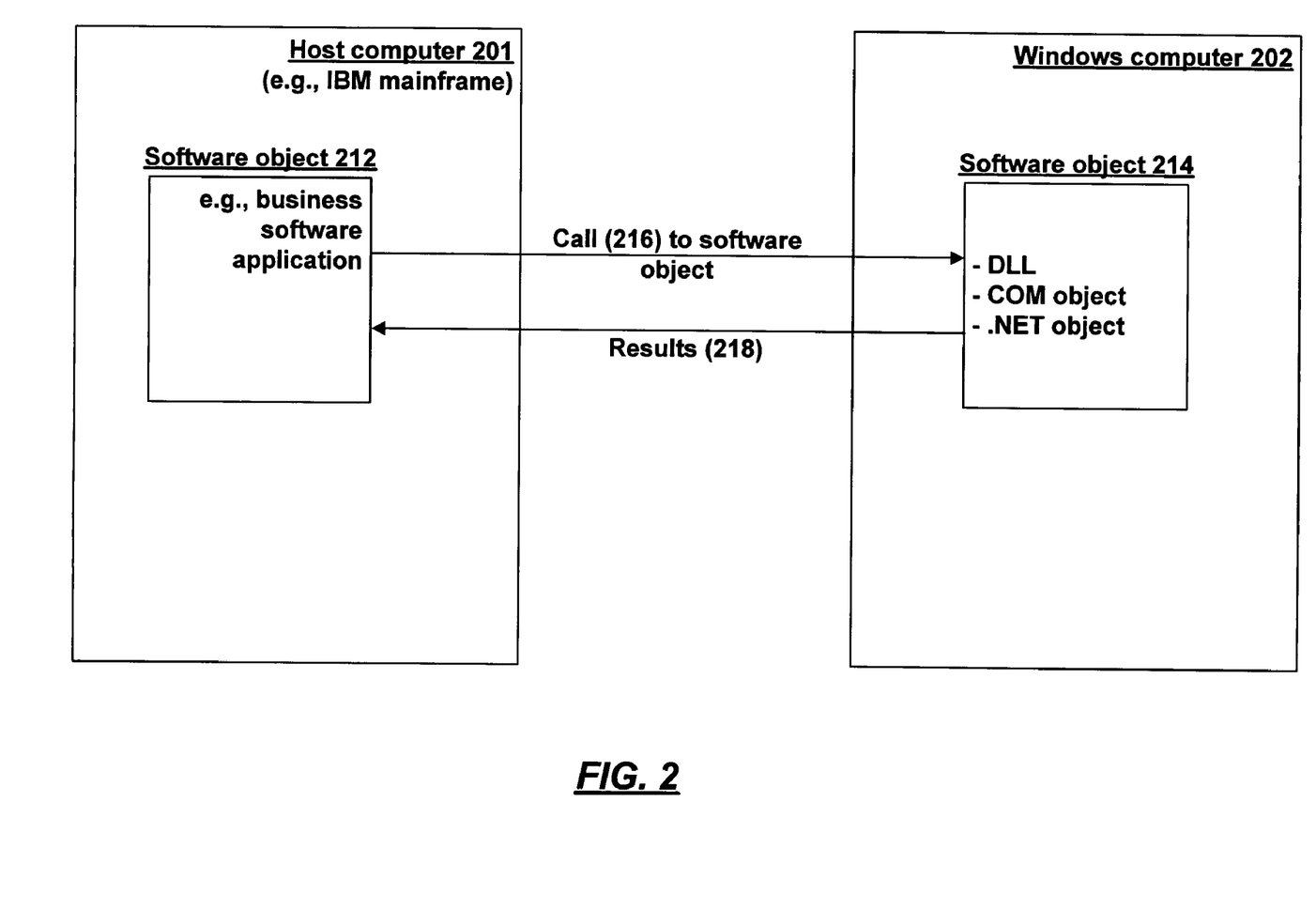
FIG. 2 is a block diagram of an exemplary interoperability scenario in a distributed computing environment.

Interoperability Between Heterogeneous Systems in a Distributed Computing Environment The present invention is directed to the problem of achieving interoperability between heterogeneous computing environment, where certain types of incompatibilities exist between the environments. FIG. 2 exemplifies an interoperability scenario that arises frequently in practical application. FIG. 2 shows a distributed computing environment that comprises two computers 201 and 202. In the example of FIG. 2, computer 202 is a system based on one of the MICROSOFT WINDOWS operating systems, and computer 201 is a system that based on some environment other than the WINDOWS operating systems. In a typical scenario, computer 201 is an IBM mainframe, although numerous other types of systems can be envisioned. (As a shorthand, computer 201 may be referred to as a "non-WINDOWS" environment or "host" environment, and computer 202 may be referred to as a "WINDOWS" environment.) Since computers 201 and 202 provide different types of environments, these computers may be described as "heterogenous."

A software object 212 resides on computer 201. Software object 212 may be any type of software, e.g., a business application such as an accounting system, an airline reservation system, etc. Software object 212 may need to use some functionality that resides on computer 202. For example, computer 202 may provide a database or a set of computational functions that software object 212 needs to access. Software object 214 resides on computer 202 and provides the functionality that software object 212 may need to access. For example, software object 212 may be a database management system that stores and retrieves information in a database, or may provide a set of accounting functions (or other computational functions) that are useful to software object 212. Thus, software object 212 issues a call 216 to software object 214. In response to the call, software object 214 provides some type of results 218 to software object 212.

Because software objects 212 and 214 operate in different types of environments (e.g., software object 212 operates in a non-WINDOWS environment, and software object 214 operates in a WINDOWS environment), there is a potential for various types of incompatibilities in terms of how software objects 212 communicate with each other. For example, software object 212 may be a piece of business software written in a dialect or style of COBOL (e.g., LU 6.2 or LINK), and software object 214 may be a dynamic-link library (DLL) that exposes a typical WINDOWS-style Application Programming Interface (API), for example a Component Object Model (COM) object or a .NET object. Thus, software objects 212 and 214 may expect to communicate in different ways, and some type of translation may be necessary in order to permit software object 212 to call, and receive results from, software object 214.

Figure 3:
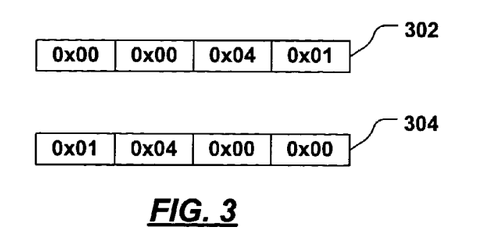
FIG. 3 is a block diagram of two potentially incompatible representations of an integer.
Figure 4:
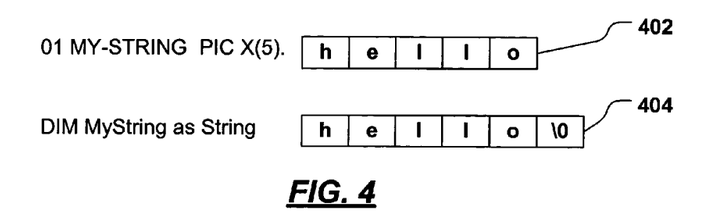
FIG. 4 is a block diagram of two potentially incompatible representations of a character string.
Figure 4A:
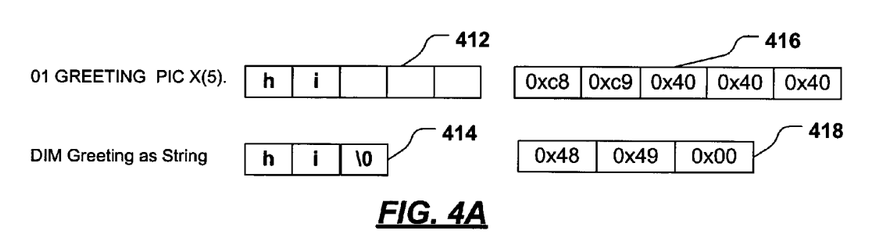
FIG. 4A is a block diagram showing a conversion of two incompatible string formats.
Figure 5:
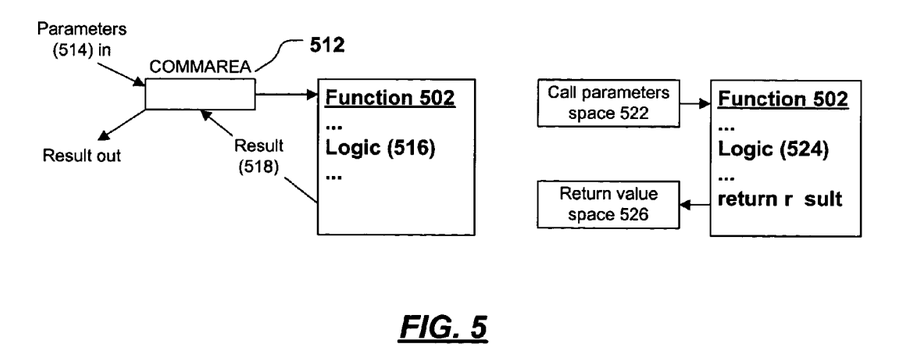
FIG. 5 is a block diagram showing two potentially incompatible protocols for calling a function.

FIGS. 3-5 show various exemplary types of incompatibilities that may arise when software running in one type of environment attempts to invoke functionality in another type of environment.

FIG. 3 shows an example of an incompatibility due to the manner in which data is represented. In the example of FIG. 3, there is shown two different representations, 302 and 304, of the decimal number 1025 as a 32-bit integer. As is known in the art, the decimal number 1025 corresponds to the hexadecimal number 0x00000401, which is four bytes long. (By convention, "0x" preceding a number indicates that the number is in hexadecimal, or base-16. Each pair of hexadecimal digits corresponds to one byte.) However, different systems may place the bytes in different orders. Representation 302 (often called "big endian") places bytes from left to right (i.e., from lowest memory address to highest) in the order of most significant byte to least significant. Thus, the least significant byte (0x01) in representation 302 appears on the right. On the other hand, representation 304 (often called "little endian") places the bytes in order of least significant to most significant. Thus, in representation 304, the least significant byte (0x01) appears on the left. If the environments provided by computers 201 and 202 do not use the same format for representing integers, then an attempt to communicate a number such as 1025 from one system (e.g., in the call parameters for call 216, or in results 218) will not be interpreted correctly by the other system.

FIG. 4 shows another example of an incompatibility based on the way that data is represented. In the example of FIG. 4, the character string "hello" is represented in two different ways. In some systems, character strings are defined to have a fixed number of characters, and in other systems character strings may have arbitrary lengths with the end of the string being signaled by a terminator. For example, representation 402 shows a COBOL declaration for a five-character string containing the characters "h", "e", "l", "l", and "o". On the other hand, representation 404 shows a Visual Basic declaration for a character string that employs a "null terminator," in which the number of characters in the string is not explicitly specified, but the end of the string is signaled by the byte 0. As in the preceding example of FIG. 3, if the two systems use different ways of representing character strings, then a string generated by one system will not be interpreted correctly by the other system. FIG. 4A shows an example of some of the conversions that may have to take place in order to make a string in one system usable in a different system. String 412 is the word "hi" represented as an exemplary COBOL string with a fixed length of five characters. Since the word "hi" has only two characters, the five-character string has three empty characters at the end. Representation 416 shows how string 412 would be represented on a typical IBM system—i.e., bytes 0xc8 and 0xc9 are EBCDIC for the letters "h" and "i", respectively, and 0x40 is the byte that represents an empty character. String 414 shows the Visual Basic representation of the same string. String 414 contains the two characters "h" and "i", followed by a zero, which signals the end of the string. As shown in representation 418, the "h" and "i" are represented as bytes 0x48 and 0x49 (which are the ASCII codes that correspond to EBCDIC codes 0xc8 and 0xc9, since IBM systems use EBCDIC and WINDOWS-based environment use ASCII), and the last byte is 0x00 representing the end of the string. Since Visual Basic strings need not have a fixed length, the padding characters that were present in string 412 and representation 416 have been removed.

FIG. 5 shows an example of an incompatibility based on the way that functions are called. Functions 502 and 504 both have a mechanism to receive call parameters and to provide a return value. However, the mechanisms are not the same. Function 502 makes use of a data space called a "COMMAREA" (communication area) 512, into which the call parameters 514 are placed by the calling function when function 502 is called. Function 502 then uses logic 516 to compute a result 518, and puts the result 518 into COMMAREA 512. The result is then retrieved from COMMAREA 512 by the calling function. Function 504, on the other hand, handles call parameters and return values differently. Function 504 receives call parameters from a calling function in a call parameters space 522. Function 504 then uses logic 524 to compute a result, and places the results into return value space 526. Thus, function 502 uses one area to both receive call parameters and provide return values, whereas function 504 uses different areas for these purposes. If two systems use different mechanisms to communicate call parameters and return values, then a call from one system to the other will not be interpreted correctly.

FIGS. 3-5 are merely some examples of incompatibilities. The following is a non-exhaustive list of other types of incompatibilities that may exist between systems:

In addition to the fact that integers can be represented differently in different systems, other data types (e.g., floating point values, etc.) may have different representations in different systems.

Different languages handle arrays in different ways. For example, in COBOL, arrays are generally fixed-sized, while in most WINDOWS-based programming models (e.g., COM), arrays are variable sized. Thus, in COBOL, an array of length five that has only two (significant)

elements is padded with three empty elements at the end, but the same array in the WINDOWS environment need not be padded. When an array in the WINDOWS environment is converted to COBOL, it may be necessary to pad or truncate the array, depending on how many elements the WINDOWS array has and how many elements the non-WINDOWS system is expecting. Rules can be created that define when it is acceptable (or not acceptable) to pad or truncate an array. Additionally, COBOL provides a type of variable-sized arrays called ODO arrays ("occurs depending on"), wherein the array can have a variable size, but the element count is stored. Since variable-sized arrays in a WINDOWS-based environment generally do not have an element count, any conversion between arrays in the WINDOWS environment ODO arrays must take the element count into account.

There may be protocol differences between two systems that affect how a function is called. For example, one system may expect a call to a software object to take the form of a single message that is passed to the object, while another system may expect a call to take the form of an interactive session in which messages are exchanged back and forth between the called object and the calling object. As another example, in some styles of programming (e.g., LU 6.2), when an application calls a remote software object, the handshaking (e.g., connect, send, receive, disconnect, etc.) required to communicate with the remote system is explicitly written into the application program, while in other styles (e.g., LINK), the handshaking is abstracted in the application program and handled by an external component that is called by the application.

There may be incompatibilities in the way that error messages are handled. For example, the SNA protocol includes a field (FMH7) for sending error reports, while the TCP protocol does not. Thus, if the TCP protocol is used for a system that expects to use the SNA protocol, then special provisions must be made for sending the information that would be contained in the SNA error field.

Exemplary System for Providing Interoperability

Figure 6:
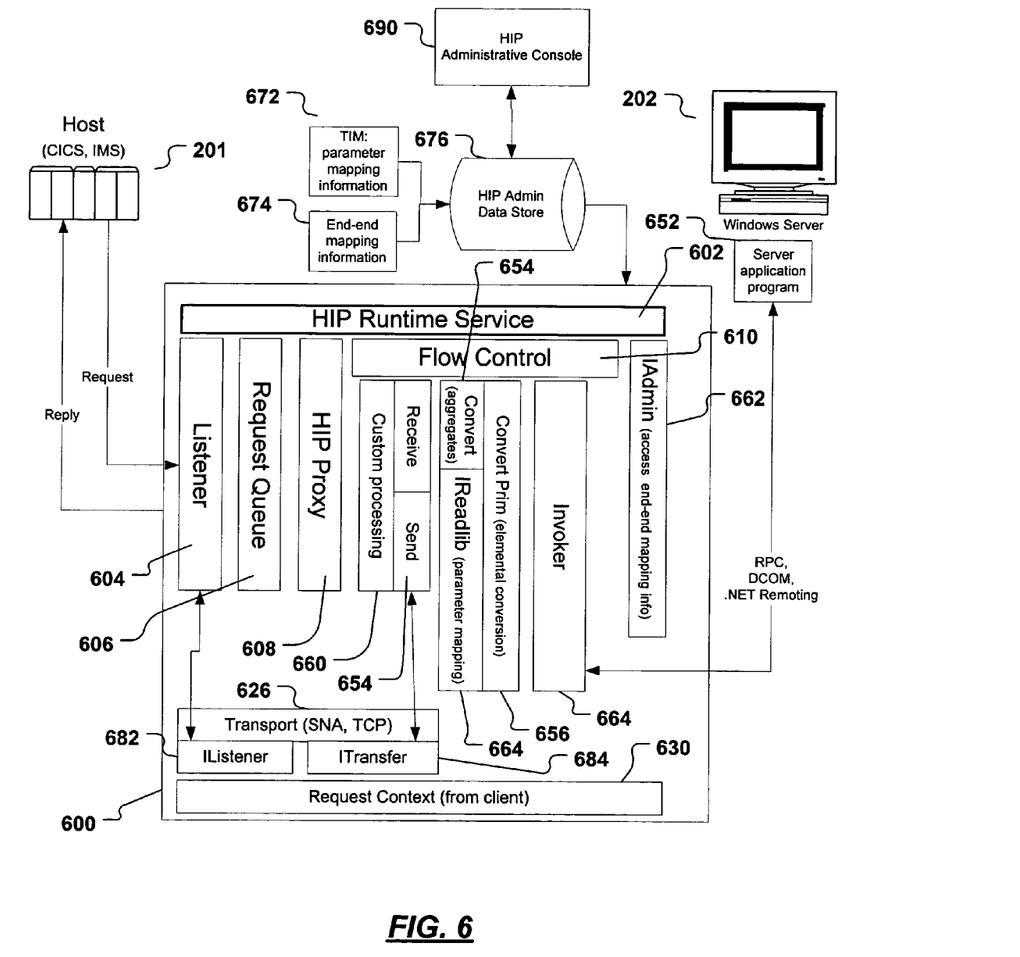
FIG. 6 is a block diagram of an exemplary system for providing interoperability.

FIG. 6 shows an exemplary system 600 for providing interoperability between heterogeneous computer systems, such as computer 201 and computer 202. System 600 supports "host initiated processing" or "HIP". System 600 preferably comprises the following components:

HIP Runtime service 602
Listener 604
Request queue 606
HIP Proxy 608
Flow control 610
Invoker 624
Conversion components 654 and 656
Send/receive object
Request context 630

These components and others are described in detail below.

HIP Runtime service 602. The runtime service is a thin layer that starts up other components in system 600. HIP runtime service starts components such as listeners 604 and HIP proxies 608. HIP runtime service 602 determines how many listeners and proxies to start based on configuration information that has been set up by an administrator.

Listener 604. The Listener receives requests from one system (e.g., computer 201) and places these requests on the request queue 606. Preferably, the listener performs its task in a very expeditious manner so that it can quickly queue a request and then resume listening for additional requests.

Request queue 606. Request queue stores the requests that have been received by listener(s) 604. In effect, request queue 606 is where request are stored after they have been picked up by listener(s) 602 and while the requests are waiting for an HIP proxy 608 (discussed below) to become available. Request queue 606, in effect, serves to:

Control resource utilization;
Establishing and enforcing throttling limits;
Caching for HIP proxy(ies) 608; and
Instantiating and tracking one or more HIP proxyies 608.

In a preferred embodiment, the functionality of request queue 606 may be implemented using an asynchronous queuing facility.

HIP Proxy 608. The HIP proxy instantiates the flow control 610 (described below) that is required to successfully manage a host-Initiated unit of work (i.e., a unit of work initiated by computer 201). HIP proxies are generic, in the sense that they are capable of instantiating flow controls for any type of host-initiated work. The particular flow control that an HIP proxy 608 will use is based on mappings that have been set up by an administrator.

Flow control 610. Flow control 610 is responsible for executing the plan that converts requests from computer 201 into a form suitable for use by applications on computer 202. This plan is defined at development time. Different flow controls are designed to handle different types of requests, which can be identified by the port on which they come in. For example, it may be defined that any request that comes in on port 1 is handled by one flow control, and request that comes in on port 2 is handled by a different flow control, etc. As one example, a flow control may be an "end point resolution" flow control that simply causes a particular method on a particular object (in computer 202) to be executed in response to a request received from computer 201.

Conversion components 654 and 656. The conversion components are used to convert data for use in one system into a form that is usable by another system. FIGS. 3, 4, and 4A above show examples of such data conversion. In a preferred embodiment, two different conversion components are used to handle different aspects of the conversion: conversion component 656 handles conversion issues related to aggregate data types (e.g., the way that the elements in a matrix are organized in the different systems), while conversion component 654 handles conversion issues related to primitive data types (e.g., conversion of integer or float formats from one system to another).

Send/receive component 658. The send/receive component is responsible for negotiating the moving of data from one system to another and back. For example, after a request has been picked up by HIP proxy 608 and a flow control 610 has been started to handle that request, the nature of how requests are made in computer 201 may be such that additional parts of the request (e.g., additional parameters) may need to be retrieved from computer 201. Send/receive component 658 may arrange for these additional parameters to be received. Send/receive component generally operates at a higher level than the transport layer, and communicates with transport component 626 to manage the transport of the information (e.g., transport component 626 may manage details of how information is packaged for use with SNA or TCP). A send/receive component 658 may have a custom processing component 660 that handles details relating to particular types of request.

Invoker 624. The invoker is the component that actually makes a call to a remote software object (e.g., server application program 652) on computer 201. For example, invoker 624 may be responsible for laying out the inbound automation parameters into an acceptable form for an IDispatch Invoke call. Invoker 624 also puts outbound automation parameters in a form that the conversion logic (i.e. convert components 654 and 656) can use to pack the data in preparation for return them to the calling application on computer 201.

Request context 630. Request context 630 is a holding place for data that is used or shared by one or more components in system 600. For example, during the processing of a given request, one component may receive or computer some data that can be used by another component. Request context 630 is essentially a buffer where this data can be stored and shared between components.

IAdmin object 662 and IReadlib object 664. These objects are used by components of system 600 to access the mapping information that has been set up to enable two systems to interoperate with each other. For example, the information that explains how to translate data types from one system into data types from another system is stored in a .TIM file (i.e., reference numeral 672). (The .TIM file is part of data store 676.) IReadlib object 664 is used to read the conversion information from a .TIM file so that it can be used (e.g., by conversion components 654 and 656) to convert data from one system to another. IAdmin object 662 is used to access end-end mapping information 674 (which is also part of data store 676). For example, end-end mapping information 674 maps, among other things, a particular .TIM file to a particular flow control, and IAdmin object 662 can be used to obtain this mapping. Once the identity of the particular .TIM file is obtained, IReadlib object 664 can be used to read the actual metadata inside the .TIM file.

Transport component 626. The transport component is used to manage issues relating to the particular type of transport protocol that is being used to communicate with computer 201. For example, computer 201 may communicate using protocols such as TCP or SNA, and transport component 626 abstracts the differences between the various protocols, so that high-level interfaces can be exposed to listener 604 and send/receive component 658. To this end, transport component 626 may include interfaces IListener 682 and ITransfer 684. For example, transport component 626 may accept incoming sockets (in TCP terms), or "allocates" (in SNA terms), and may use IListener 682 to expose a high-level interface to listener 604 that abstracts the differences between these protocols. Similarly, ITransfer interface 684 may expose an interface to send/receive component 658 that allows send/receive component 658 to send and receive data without concern for the differences between the different protocols.

One example aspect of transport that transport component 626 may need to deal with is error handling, since TCP and SNA handle errors in different ways. At a basic level, handling of errors for SNA implies returning an FMH-7 that contains a descriptive indication of the error. The FMH-7 only addresses the reporting of errors to the transaction monitor and not to the client application program itself. Since the FMH-7 field is not available in TCP, return meaningful error information to a TCP client preferably requires the use of meta data in at least the reply. Transport component 626 may assist in formatting error information for TCP or SNA, as appropriate.

HIP Administrative Console 690. The administrative console is where an administrator configures system 600. An administrator may use administrative console 690 to specify mappings for particular types of transactions. For example, an administrator may specify that when a request comes in on port 1, a particular flow control is to be used to process that request. Additionally, the administrator may configure the system with such parameters as how many listeners 604 should be started, how many HIP proxies 608 should be started, etc.

Exemplary Development Process for Interoperability

Figure 7:
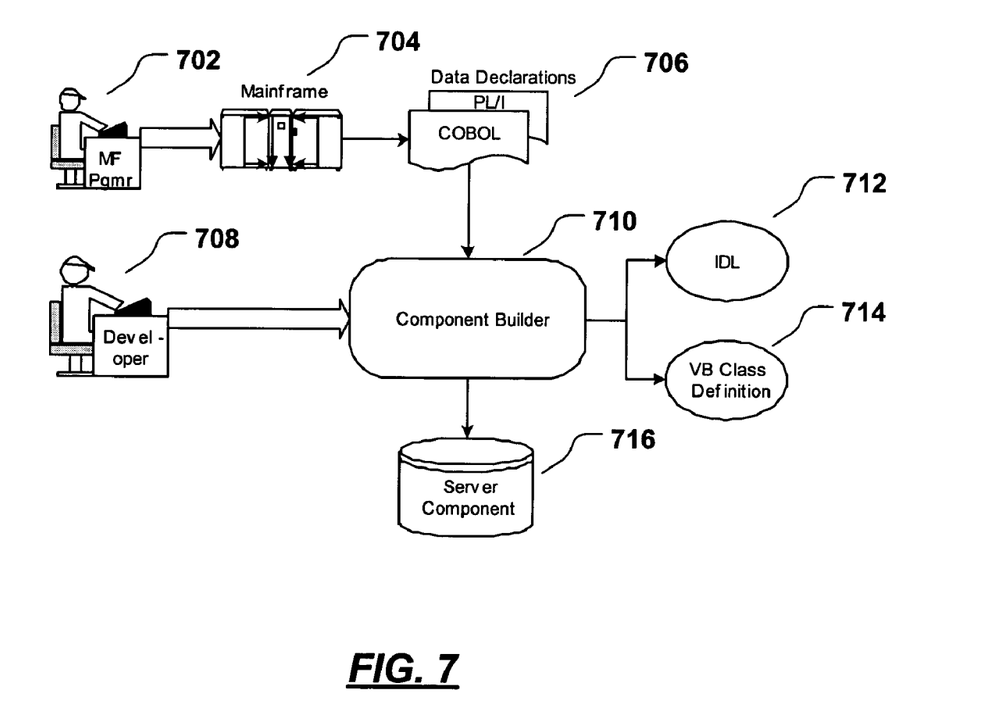
FIG. 7 is a flow diagram of a process for supporting interoperability among computing environments.

FIG. 7 shows an exemplary process to support interoperability among different computing environments. Initially, a programmer 702 writes a program for a computer. For example, programmer 702 may be a mainframe programmer writing code for an IBM mainframe 704. The program written by programmer 702 includes various data declarations 706. The program may be in an old language, such as COBOL or RPG. Since each programming language has a different model for data types, data declarations 706 may have a substance or style that is particular to COBOL or RPG (e.g., the data declarations may have dependent- or dynamic-sized arrays, which exist in COBOL but not in Visual Basic).

After code has been written for mainframe 704, at some point in the future developer 708 undertakes the task of enabling the mainframe code to call a component in a Windows-based system. Developer 708 uses component builder 710 in order to create the information that will aid in the conversion of data and programming model from the mainframe environment to the Windows environment. In particular, the component builder 710 generates an IDL (Interface Definition Language) 712 description of the portion of the mainframe code that will need to interact with Windows, and also generates Visual Basic class definitions 714 corresponding to the mainframe code's data declarations 706. It should be noted that some data types in Visual Basic may correspond very closely to data types in typical mainframe languages (such as COBOL or RPG), and others may not. For example, Visual Basic and COBOL both have integers, but COBOL has dependent-sized arrays and Visual Basic does not.

After the information that will support interoperability has been created, it is stored in a server component 716 for use by HIP service 602 described above.

Figure 8:
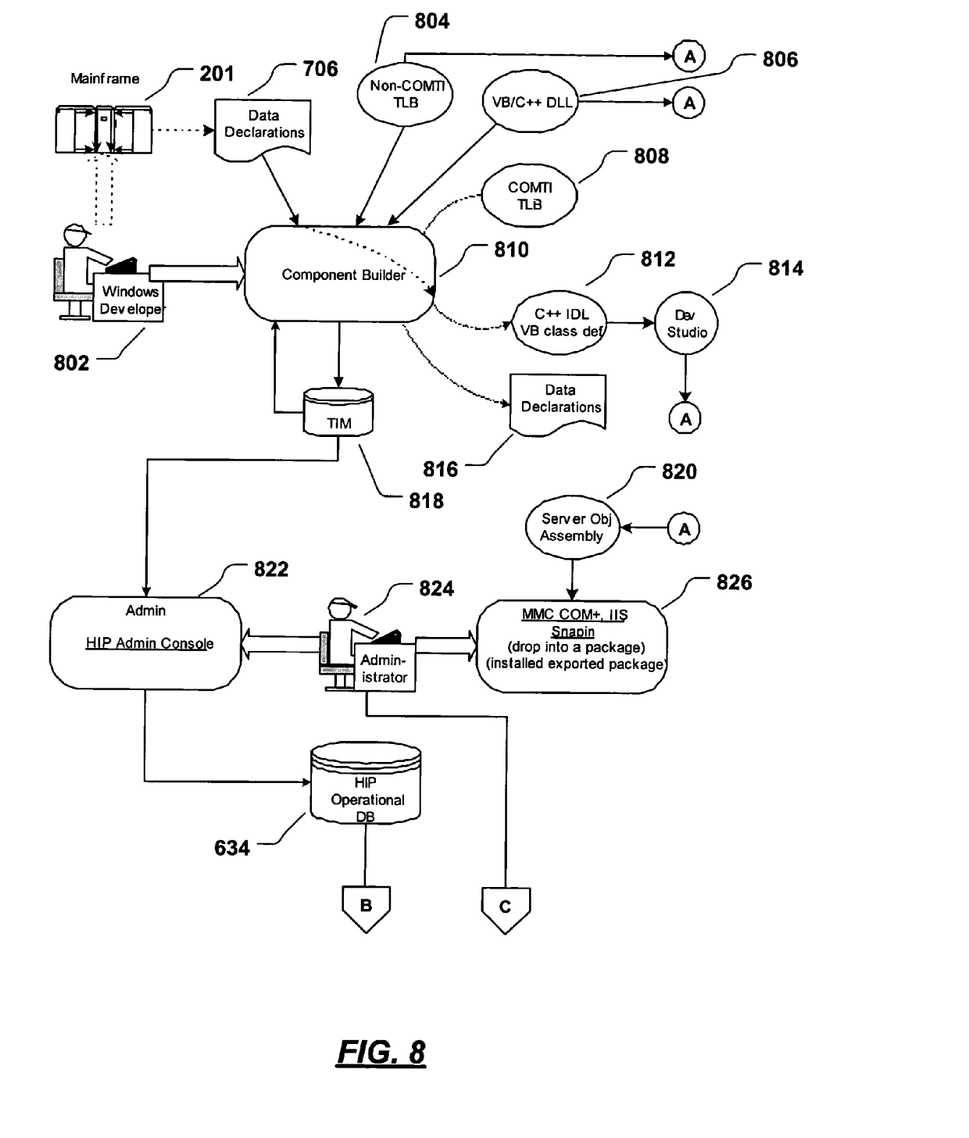
FIGS. 8-9 are a flow diagram of an end-to-end process of using a HIP system, from both a developer's perspective and a user's perspective.
Figure 9:
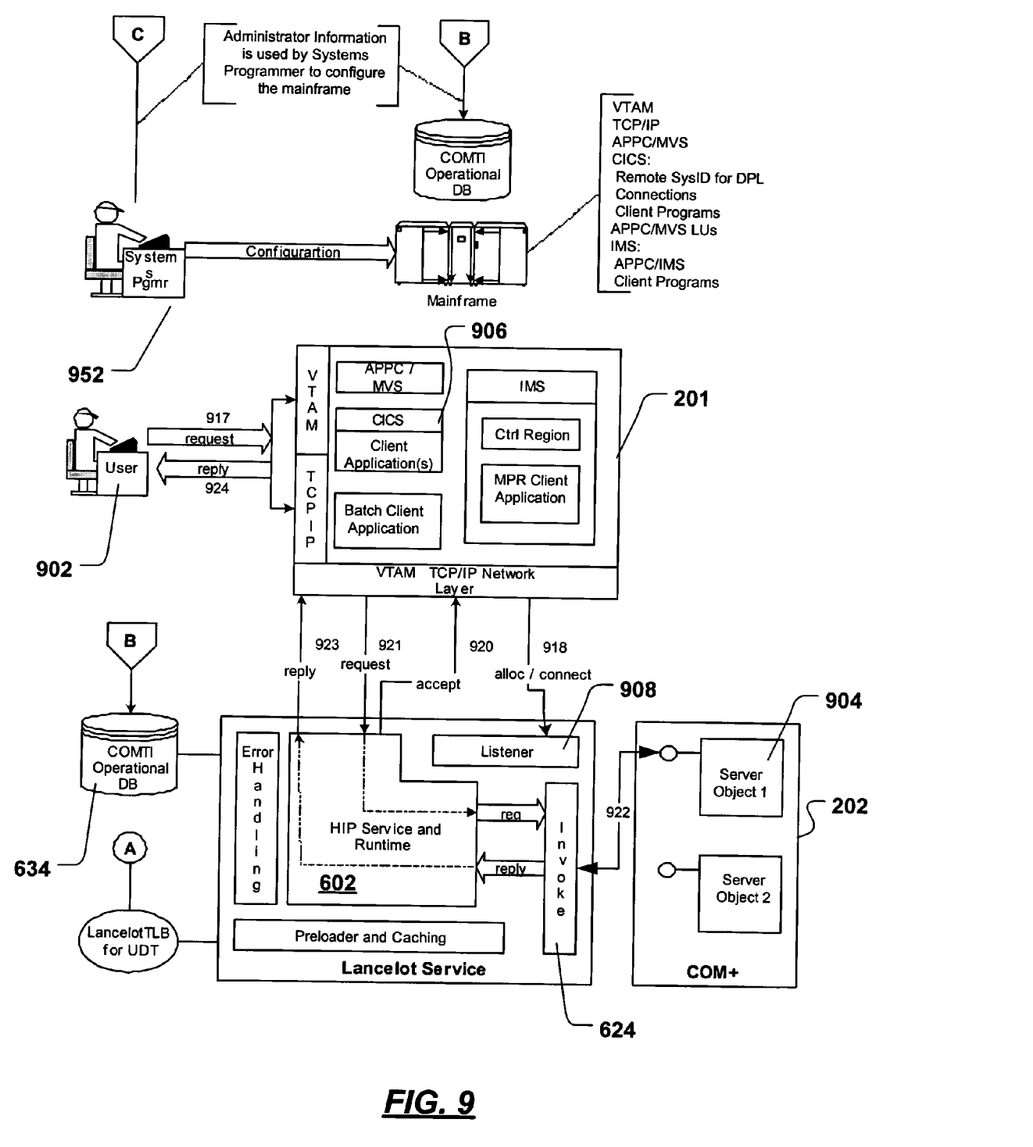

FIGS. 8-9 show the end-to-end experience of an HIP system from both the development and user perspective. Mainframe 201 is a non-WINDOWS system (e.g., a legacy system), and it is desired to allow applications on mainframe 201 to call software objects in a WINDOWS-based environment. A developer 802 uses a component builder tool 810 to prepare components that will allow an application on mainframe 201 to call software objects in a WINDOWS-based system. Developer 802 uses component builder tool 810 to analyze data declarations 706 that are associated with the legacy application. Additionally, component builder tool has available to it a COMTI type library ("TLB") 808 (COMTI stands for "COM Transaction Integrator," which is a system that allows WINDOWS-based applications objects to call non-WINDOWS based software objects), a non-COMTI type library 804, and dynamic link libraries (DLLs) 806 (which are code modules written in languages such as C++ and Visual Basic). Component builder 810 allows developer 802 to uses the above-mentioned information to create conversion information that will allow the HIP system to convert a call from mainframe 201 into a form that is usable by a WINDOWS-based software object. The conversion information produced by component builder 810 is stored in a .TIM file 818. The substance of this conversion information includes class definitions 812 and data declarations 816. Class definitions 812 may be later used in a developer's studio 814.

After the conversion information has been stored in .TIM file 818, an administrator 824 may prepare the HIP system to work with the application that developer 802 analyzed with component builder 810. Administrator 824 uses an administrative console 822 to install the conversion information contained in the .TIM file 818 into database 634. Additionally, the administrator specifies end-end mappings (i.e., mappings 674, shown in FIG. 6), which will be used for transaction interoperability (blocks 820,826).

Additionally, a systems programmer 952 may perform whatever configuration (VTAM, NCP, TCP/IP, CICS, IMS) may be necessary to enable mainframe 201 and/or an application on mainframe 201 to work with the HIP service. The HIP service is now ready to process a call to a WINDOWS-based software object from an application on mainframe 201.

User 902 is a user of a computer 201, such as an IBM mainframe. At some point during user 902's use of the computer, user makes a request 917 that results in calling a component in a WINDOWS-based environment 904 on computer 202. For example, user 902 may operate a client application 906, which calls upon some functionality that is available in WINDOWS-based environment 904. Computer 201 thus generates an connection request 918, which is picked up by listener 908. Listener 908, informs HIP service 602 of the connect request, which causes HIP service 602 to send an accept message 920 back to computer 201. Computer 201 then sends request 921 to HIP service 602. Request 921 is the substantive request to initiate some functionality in the WINDOWS-based environment 904 (as opposed to the alloc/connect request 918, which merely requests a connection to the WINDOWS-based environment for the purpose of making a substantive request). Using components that were described above in connection with FIG. 6, HIP service 602 causes request 921 to be converted into a format that can be understood by a WINDOWS-based component, such as server object 951, which will provide the requested functionality. HIP service 602 uses invocation component 624 to invoke server object 951 in WINDOWS-based environment 904. (In one example, server object 951 may be a COM server, although it will be understood that this embodiment is not limiting of the invention.) Server object 951 then performs whatever processing is specified by the request and provides a reply to invocation component 624. (Both the actual invocation of server object 951, and the reply provided by server object 951, are marked as reference numeral 922.) The reply is provided to HIP service 602. HIP service 602 then packages the reply in a manner that can be understood by the environment and/or programming model at computer 201. This "packaging" may include conversion of data types, conversion of protocols, and the like as described above in connection with FIG. 6. Once the reply has been packaged in this manner, the reply 923 is provided to computer 201.

Exemplary Process for Interoperability Using HIP Service

Figure 10:
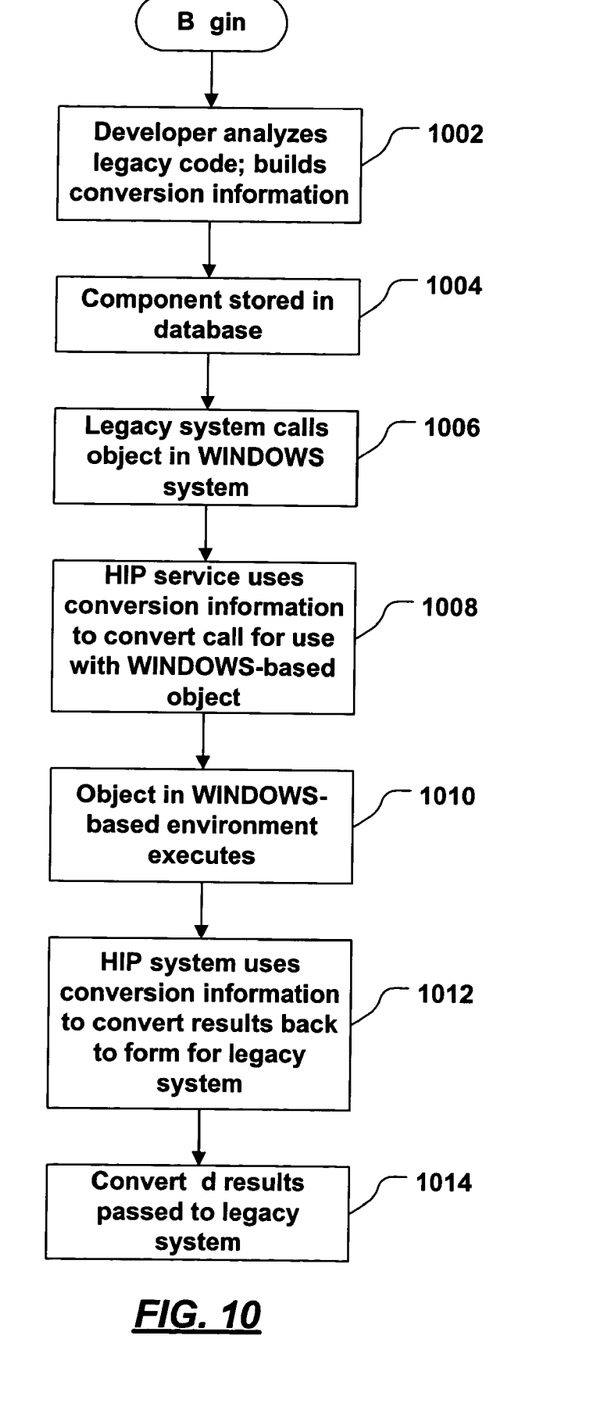
FIG. 10 is a flow diagram of an exemplary process of using an HIP system.

FIG. 10 shows an overview of an exemplary process whereby one system may interoperate with another system using an HIP service, such as HIP service 602 (shown in FIG. 6). In the example of FIG. 10, it is assumed that a non-WINDOWS system (e.g., a legacy system) will call a software object in a WINDOWS-based system.

Initially, a developer analyzes legacy code, and uses a tool to build conversion information that will enable the legacy code to interoperate with a software object in a WINDOWS-based system (block 1002). These component may, for example, include type libraries, conversion tables, and custom conversion components. The components that are created are stored in a database (block 1004), where they can be used by the HIP service.

After the conversion information has been prepared, the legacy system, at some point during its operation, calls a software object in a WINDOWS-based environment (block 1006). Instead of the call being communicated directly to the software object, it is received by the HIP service. The HIP service then uses the conversion information (i.e., the metadata) to convert the call for use with a WINDOWS-based software object (block 1008). The various types of incompatibilities that can arise, as well as various conversion techniques and mechanisms, are discussed above.

After the call has been converted, the converted call is used to invoke the software object in a WINDOWS-based environment. That software object then executes (block 1010). The software object produces some type of results (e.g., a return value). The HIP service then uses the conversion information to convert the results to a form that is usable with the legacy system (block 1012). The various incompatibilities that can arise in presenting a result, as well as various conversion techniques and mechanisms, are discussed above.

After the results have been converted, the converted results are passed to the legacy system (block 1014).

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of enabling a first system to use a second system comprising:
   receiving at least one data declaration pertaining to the first system;
   generating an interoperability information for the first and the second systems comprising:
      an interface definition language ("IDL") description of a portion of code on the first system for interacting with the second system;
      at least one class definition pertaining to the at least one data declaration of the first system;
   storing the interoperability information;
   receiving at the first system, a first request directed to the second system, said first request being in a form adapted for the first system but not for the second system;
   performing a first conversion of said first request to produce a second request using the interoperability information, said second request being in a form adapted for said second system but not for said first system, said first conversion performed using a host initiated processing (HIP) system that includes one or more listeners for receiving the first request and one or more HIP proxies for instantiating at least one flow control, each of the at least one flow control associated with a respective requesting port, for the first conversion, the number of listeners and the HIP proxies to use in the first conversion is determined by an HIP runtime service based on pre-stored configuration information, the HIP system further including a first object to read conversion information from a file that explains how to translate data types from the first system to the second system to a particular flow control and a second object to access end-to-end mapping information from the file to a particular flow control;

invoking a processing of said second request by the second system;

receiving a first reply from the second system, said first reply comprising an FMH7 field, said FMH7 field containing error information;

performing a second conversion of said first reply using the interoperability information to produce a second reply that comprises header information that is usable with an Internet protocol and that represents said error information contained in said FMH7 field; and providing said second reply to said first system.

2. The method of claim 1, wherein said first request comprises a datum in a first format, and wherein said act of performing said first conversion comprises:

converting said datum to a second format different from said first format, said second request comprising said datum in said second format.

3. The method of claim 1, wherein said first request comprises a datum having a first type, and wherein said act of performing said first conversion comprises:

converting said datum to a second type different from said first type, said second request comprising said datum in said second type.

4. The method of claim 3, wherein said first type is supported in said first system but not in said second system.

5. The method of claim 3, wherein said second type differs structurally from said first type in at least one aspect.

6. The method of claim 1, wherein said first request comprises a call using a first mechanism to a software object in the second system, and wherein said act of performing said first conversion comprises:

converting said call for use with a second mechanism different from said first mechanism.

7. The method of claim 6, wherein said first mechanism comprises a commarea (communication area) that is used to pass a call parameter to said object and to receive a result from said object, and wherein said second mechanism comprises:

a first area that is used to pass said call parameter, or a converted call parameter that corresponds to said call parameter, to said object;

and a second area that is used to receive said result, or a converted result that corresponds to said result, from said object.

8. The method of claim 1, wherein said first request comprises a remote call according to a first protocol, wherein said second request comprises a remote call according to a second protocol different from said first protocol, and wherein said act of performing said first conversion comprises:

preparing said second request to correspond substantively with said first request and to work in accordance with said second protocol.

9. The method of claim 8, wherein said first protocol calls for invocation to be performed with a bidirectional interaction between a caller and a callee, wherein said second protocol calls for an invocation to be performed in a unidirectional call message from said caller to said callee, and wherein said act of preparing said second request comprises:

engaging in an interaction with the caller on the first system to obtain information relating to a call;

collecting said information; and preparing said second request using the collected information.

10. The method of claim 1, wherein said first system is adapted to communicate a remote call according to a first network protocol, and wherein said second request, and said first reply, are transmitted using a second network protocol different from said first network protocol, and wherein said acts of performing first and second conversions comprise:

including in said second request and said second reply header information that corresponds to information that is contained in requests or replies according to said first protocol.

11. The method of claim 1, wherein said first request comprises a call to a software object in said second system, and wherein the form of said first request is adapted for making requests from the first system to a remote system that is of the same type of environment as the first system.

12. A method of enabling a first software object in a first system to call a second software object in a second system, the method comprising:

evaluating first information that the first software object exposes when making a call to a remote system;

evaluating second information that the second software object exposes when receiving a call from a remote system;

receiving at least one data declaration pertaining to the first system;

generating an interoperability information for the first and the second systems comprising:

an interface definition language ("IDL") description of a portion of code on the first system for interacting with the second system;

at least one class definition pertaining to the at least one data declaration of the first system;

storing the interoperability information;

generating a conversion information using the interoperability information and the first and second information descriptive of a process to be followed in order to convert the first information into a form compatible with the second information, said conversion information describing a conversion of an FMH7 field into header information usable with an Internet protocol;

providing the conversion information to a conversion service that uses the conversion information to convert a first call from the first object into a second call in a form usable by the second object, said conversion service using a host initiated processing (HIP) system that includes one or more listeners for receiving the first request and one or more HIP proxies for instantiating at least one flow control, each of the at least one flow control associated with a respective requesting port, for the first conversion, the number of listeners and HIP proxies to use in the first conversion is determined by an HIP runtime service based on pre-stored configuration information, the HIP system further including a first object to read conversion information from a file that explains how to translate data types from the first system to the second system to a particular flow control and a second object to access end-to-end mapping information from the file to a particular flow control.

13. The method of claim 12, wherein the first information comprises a call parameter in a first format, wherein the second information comprises a call parameter in a second format, and wherein the act of generating conversion information comprises:

generating code or data that describes how to convert a call parameter from the first format to the second format.

14. The method of claim 12, wherein the first information comprises a call parameter of a first data type which is not usable by the second software object, and wherein the act of generating conversion information comprises:

generating a second data type that corresponds to the first data type and which is usable by the second software object;

generating code or data that describes how to convert data of the first data type to the second data type.

15. The method of claim 12, wherein the first information comprises a return value in a first form, wherein the second information comprises a return value in a second form different from said first form, and wherein the act of generating conversion information comprises:

generating code or data that describes how to convert data in said first form to said second form.

16. The method of claim 12, wherein said first software object makes a call to a remote system according to a first programming model, wherein said second data object receives a call from a remote system according to a second programming model, and wherein the act of generating conversion information comprises:

generating code or data that indicates which programming model the first software object uses to make a remote call.

17. The method of claim 16, wherein the act of generating conversion information comprises:

generating code or data that describes at least one customization in converting from the first programming model to the second programming model.

18. The method of claim 12, wherein the act of generating conversion information comprises:

generating a transaction initiation message that is used in invoking the second software object or in reply to the first software object.

19. A system to enable a first software object in a first environment to call a second software object in a second environment, the system comprising:

hardware comprising at least one processor;

a component builder module that operates on said hardware, said component builder:

receiving at least one data declaration pertaining to the first system;

generating an interoperability information for the first and the second systems comprising:

an interface definition language ("IDL") description of a portion of code on the first system for interacting with the second system;

at least one class definition pertaining to the at least one data declaration of the first system;

storing the interoperability information;

a service object that executes on said hardware and that receives a first request from the first software object, converts the first request into a second request which is in a form usable by the second software object, and presents the second request to the second software object using the interoperability information;

a host initiated processing (HIP) system that includes one or more listeners for receiving the first request and one or more HIP proxies for instantiating at least one flow control, each of the at least one flow control associated with a respective requesting port, for the conversion, the number of listeners and HIP proxies to use is determined by an HIP runtime service based on pre-stored configuration information, the HIP system further including a first object to read conversion information from a file having transaction integrator metadata extension (.TIM file) that explains how to translate data types from the first system to the second system to a particular flow control and a second object to access end-to-end mapping information from the .TIM file to a particular flow control, the HIP system further including first and second conversion components, the first conversion component handling conversion issues related to aggregate data types and the second conversion component handling conversion issues related to primitive data types; and an error handling object that executes on said hardware and that receives an indication of an error from the second software object and packages the error into a form usable by the first environment or the first software object, wherein the indication of said error comprises an FMH7 field, and wherein said error handling object creates header information representative of the contents of said FMH7 field, said header information being adapted for use with an Internet protocol.

20. The system of claim 19, wherein the service object further receives a first reply from the second software object, converts the first reply to a second reply which is in a form usable by the first software object, and provides the second reply to the first software object.

21. The system of claim 19, wherein the service object comprises:

a listener object that executes on said hardware and that detects that a contact regarding the first request has been made by the first software object.

22. The system of claim 19, wherein the service object comprises:

a queuing object that executes on said hardware and that queues at least one of connections and requests from the first system.

23. The system of claim 19, wherein the service object comprises:

a transit object that executes on said hardware and that receives information related to the first request from the first software object and prepares the information into a form that can be used for a call to the second software object.

24. The system of claim 23, wherein the service object further comprises:

an invocation object that executes on said hardware and that lays out the information prepared by the transit object into a form that can be used for a call to the second software object, and that uses the laid out information to invoke the second software object.

25. The system of claim 19, wherein the service object comprises:

a flow control object that executes on said hardware and that manages the interaction of one or more components involved in the conversion of the first request into the second request.

26. A computer-readable storage medium encoded with computer-executable instructions to facilitate interoperability between a first system and a second system, the instructions being adapted to perform acts comprising:

receiving at least one data declaration pertaining to the first system;

generating an interoperability information for the first and the second systems comprising:

an interface definition language ("IDL") description of a portion of code on the first system for interacting with the second system;
at least one class definition pertaining to the at least one data declaration of the first system;
storing the interoperability information;
receiving a first call from a first software object in the first system to a second software object in the second system, the first call being in a format that is not compatible with the second system;
converting the first call into a second call using the interoperability information, the second call being in a format that is compatible with the second system, said converting performed using a host initiated processing (HIP) system that includes one or more listeners for receiving the first request and one or more HIP proxies for instantiating at least one flow control, each of the at least one flow control associated with a respective requesting port, for the first conversion, the number of listeners and HIP proxies to use in the first conversion is determined by an HIP runtime service based on pre-stored configuration information, the HIP system further including a first object to read conversion information from a file that explains how to translate data types from the first system to the second system to a particular flow control and a second object to access end-to-end mapping information from the file to a particular flow control, the HIP system further including first and second conversion components, the first conversion component handling conversion issues related to aggregate data types and the second conversion component handling conversion issues related to primitive data types;
converting an FMH7 field generated by said first system into header information usable by an Internet protocol;
invoking the second software object using the second call;
listening for a connection from the first system; and
receiving information related to the first call in response to the connection, wherein the first call comprises data in a first form; and
converting the data from the first form into a second form usable by the second software object.

27. The computer-readable storage medium of claim 26, wherein the second software object provides a first reply in response to being called, and wherein the instructions are adapted to perform acts further comprising:
converting the first reply into a second reply, the second reply being in a form that is compatible with the first software object or the first system, the first reply being in a form that is not compatible with the first software object or the first system.

28. The computer-readable storage medium of claim 26, wherein the second software object generates error information in response to being called, and wherein the instructions are adapted to perform acts further comprising:
converting said error information into a format compatible with the first software object or the first system, or into a format compatible with a communication protocol employed by the first system.

\* \* \* \* \*